United States Patent [19]

Juy, deceased

[11] 4,155,270

[45] May 22, 1979

[54] CONTROL LEVER APPARATUS FOR SPEED CHANGE DEVICES FOR BICYCLES

[75] Inventor: Lucien C. H. Juy, deceased, late of Dijon, France, by Henry Juy, heir

[73] Assignee: Le Simplex, Dijon, France

[21] Appl. No.: 780,358

[22] Filed: Mar. 23, 1977

[30] Foreign Application Priority Data

Mar. 23, 1976 [FR] France .............................. 76 09754

[51] Int. Cl.² .................. G05G 7/00; G05G 5/14; B62K 23/06
[52] U.S. Cl. .................................. 74/475; 74/489; 74/530; 74/533; 74/578; 116/67 R; 116/DIG. 20
[58] Field of Search ............... 74/475, 527, 530, 533, 74/538, 578, 488, 489

[56] References Cited

U.S. PATENT DOCUMENTS

| | | | |
|---|---|---|---|
| 629,208 | 7/1899 | Riblet, Sr. ........................ | 74/530 |
| 787,843 | 4/1905 | Honscheid ....................... | 74/538 |
| 1,407,879 | 2/1922 | Nauts .............................. | 74/538 X |
| 1,413,805 | 4/1922 | Stephenson ..................... | 74/538 |
| 2,544,866 | 3/1951 | Travis ............................. | 74/538 X |
| 2,918,829 | 12/1959 | Piercy ............................. | 74/538 |
| 3,293,382 | 12/1966 | Lewandowski et al. ......... | 74/527 X |
| 3,481,217 | 12/1969 | Maeda ............................. | 74/489 |
| 3,554,158 | 1/1971 | Shimano et al. ................. | 74/489 X |

Primary Examiner—Allan D. Herrmann
Attorney, Agent, or Firm—Haseltine, Lake & Waters

[57] ABSTRACT

Control lever apparatus for speed change devices for bicycles comprising a pivotal lever for controlling speed change and a shaft rotatably supporting the lever. The shaft is fixed and the lever rotatable and a sound producing mechanism is mounted between the shaft and the lever for producing an audible sound as the lever undergoes rotation. The sound producing mechanism comprises a toothed wheel secured to the shaft and a shoe mounted in a recess in the lever for undergoing relative angular movement with respect to the wheel as the lever is rotated. The shoe is supported in the recess for undergoing limited radial and angular displacement relative to the wheel. The shoe has a plurality of teeth arranged along an annular sector for engagement with the teeth of the wheel. Elastic blades are formed on the shoe and bear against the lever at the recess to yieldably urge the teeth of the shoe and the wheel in engagement. Two levers can be provided at opposite ends of a block which houses the shaft and the block can form part of a mounting device on the tubular element of the body of the bicycle.

10 Claims, 9 Drawing Figures

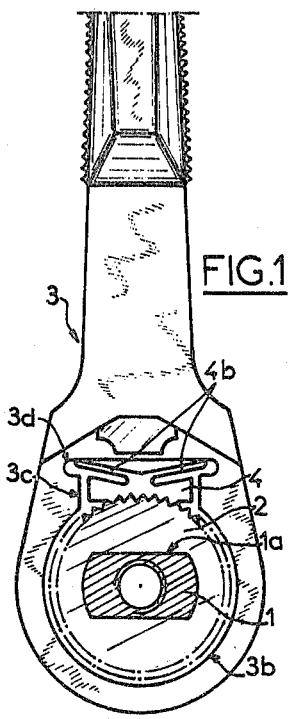
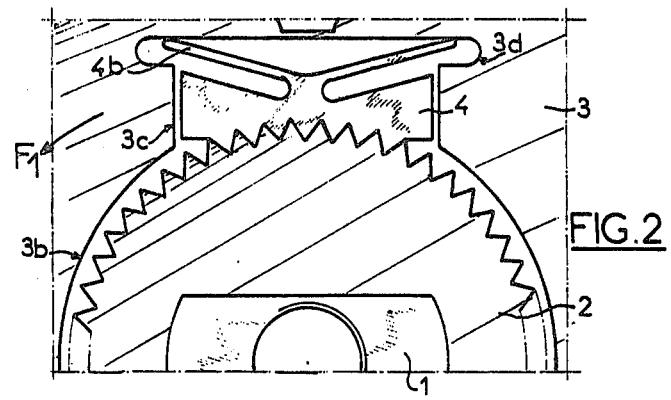
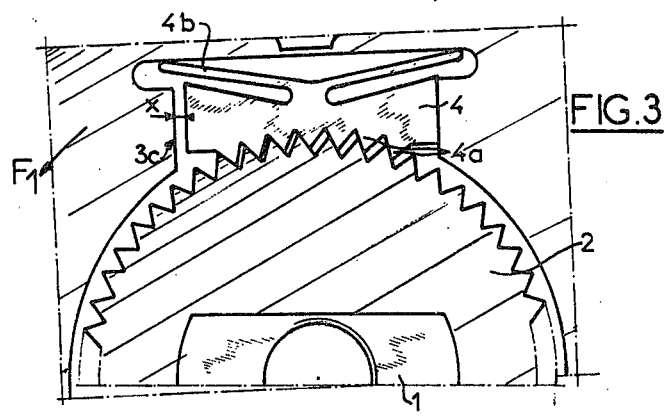
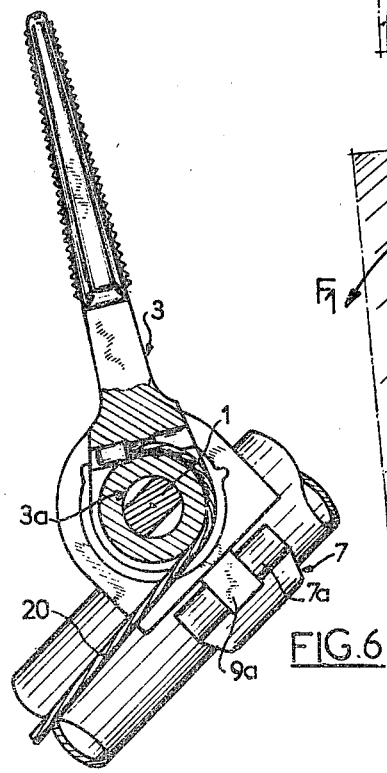
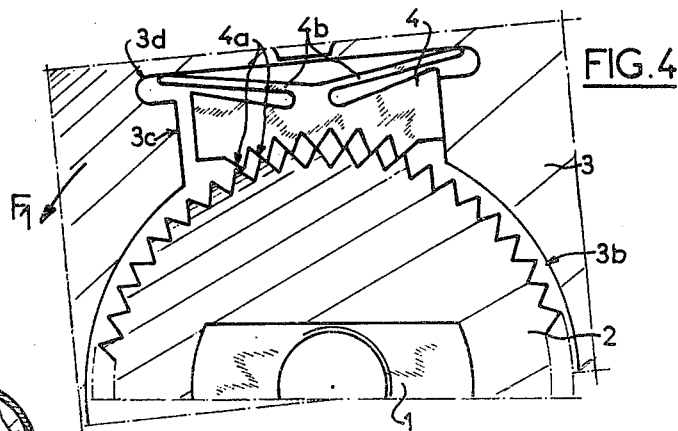

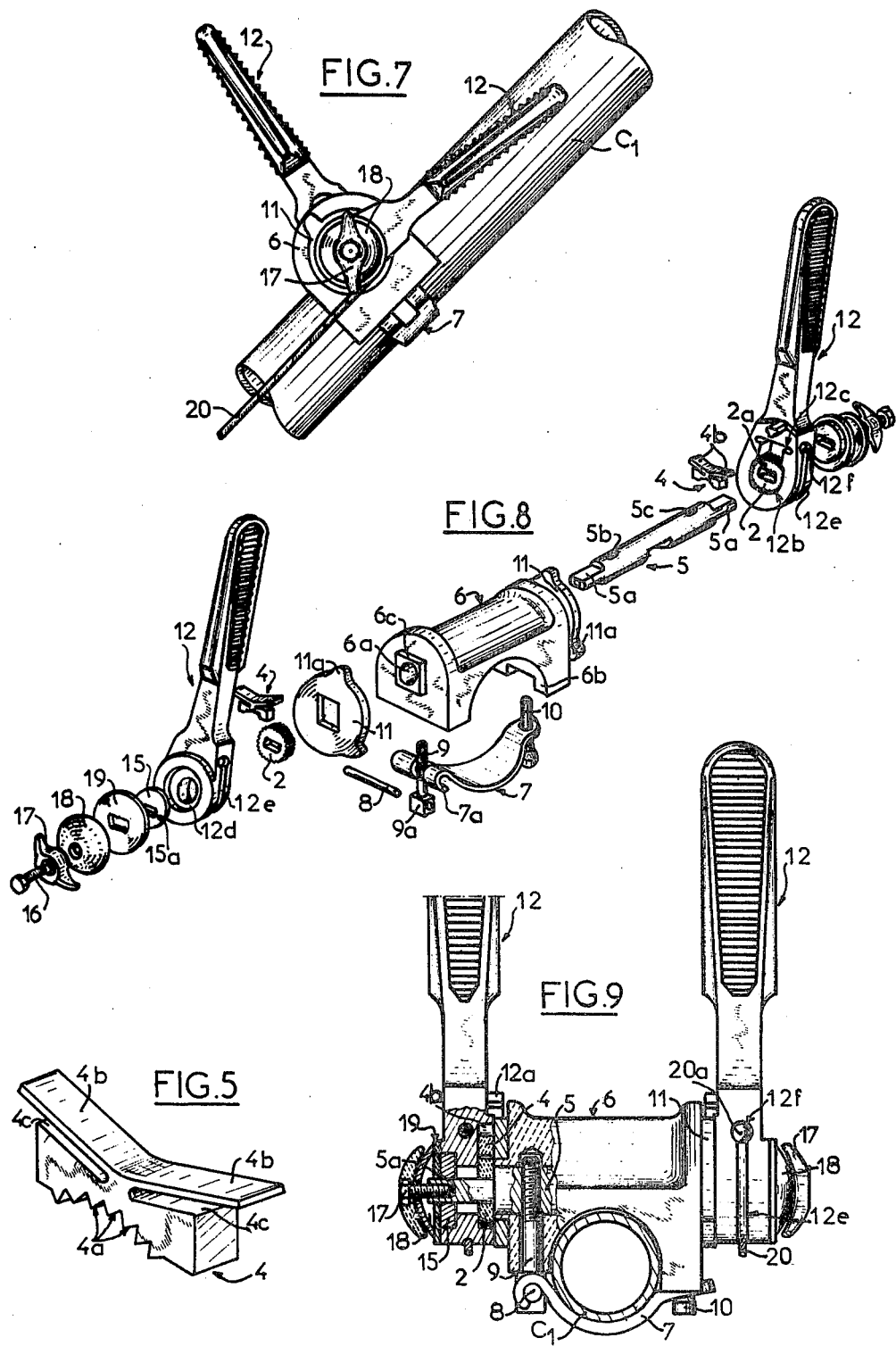

CONTROL LEVER APPARATUS FOR SPEED CHANGE DEVICES FOR BICYCLES

SUMMARY OF THE INVENTION

The invention relates to improvements in control levers for speed change devices for bicycles and similar vehicles.

According to the invention it is contemplated to provide apparatus which will produce a noise audible to the cyclist corresponding to the operation of the lever or control means for effecting speed change, said apparatus being particularly simple, effective and economical.

It is also desired to provide an efficient and advantageous mounting of the control levers for speed change and for the shaft supporting the levers with respect to the frame of the bicycle.

According to the first feature of the invention, in order to make the angular displacements of the control lever audible in one direction or the other, there is mounted between the shaft of the lever and the axial portion of the lever, a system of a toothed wheel and at least one shoe movable in a housing with latitude for radial and angular displacement with respect to the wheel, the said shoe having on a suitable angular sector a plurality of teeth corresponding to the teeth of the wheel, and an elastic system acting constantly to urge the teeth of the shoe into engagement with the teeth of the wheel.

According to another feature of the invention the fixed shaft carrying one or more control levers for change of speed is mounted fixedly in a block that it traverses, said block having, in a direction perpendicular to the hole for passage of the shaft, a semi-cylindrical recess permitting mounting on the tube of the frame of the bicycle, the locking bolts of a complimentary semi-cylindrical collar being threadably engaged in threaded holes of said shaft, said block effecting spacing of the levers which are pivotably mounted on the shaft of the extremities of the block, stop means being provided for applying elastic, axial, adjustable pressure against the levers, cooperating with the said extremities of the shaft.

BRIEF DESCRIPTION OF THE DRAWINGS

FIG. 1 is a side view in partial section illustrating a control lever equipped with the apparatus for producing audible sound according to the invention.

FIGS. 2, 3, and 4 are side views on greater scale showing the sound producing apparatus in different angular positions.

FIG. 5 is a perspective view illustrating one embodiment of the toothed shoe.

FIG. 6 is a view partially broken away in section showing an embodiment of mounting of the lever according to FIG. 1 on an attachment means on an element of the frame of the bicycle.

FIG. 7 is a front view illustrating the mounting of two control levers on one block forming a half of a collar assembly for attachment to the frame of the bicycle.

FIG. 8 is an exploded view of the elements, in their order of mounting, composing the control members according to the invention.

FIG. 9 is an elevation view, partially in section illustrating the mounting of the control levers and the half-collars on the frame of the bicycle.

DETAILED DESCRIPTION

In FIGS. 1 to 6, there is seen a shaft 1 having parallel flat surfaces 1a for the engagement and angular indexing of a toothed wheel 2 having a bore 2a corresponding to the shaft 1. A portable control lever 3 has a bore 3a for passage of the shaft 1 and a recess 3b on one side surface for receiving the toothed wheel 2.

A slot 3c opens into the recess 3b and receives a shoe 4 having a surface facing the toothed wheel which is provided with teeth 4a, along an arc of a circle corresponding to the radius of the toothed wheel. The teeth 4a are similar to those of the wheel. On its opposite surface the shoe is formed with flexible blades 4b which are integrally molded with the shoe. The blades are spaced from the body of the shoe but are connected thereto through a median portion. These flexible blades bear at their extremities on the bottom of the slots 3c in the position where the teeth of the shoe extend into the hollows of the teeth on the wheel.

The blades extend beyond the lateral sides of the shoe and their extremities can engage in undercuts 3d in the slot 3c It is noted that the extremities of the rear face 4c are sufficiently spaced to permit the spring blades to work freely without risk of jamming in the position where compression is most important.

It is also to be noted that slot 3c is dimensioned such that the shoe is received therein with clearance x at least equal to one-half of a tooth or one-half of the pitch, preferably slightly greater in order to augment the sound effect and promote the scrap or clap of the teeth of the shoe against the flanks of the teeth of the wheel at the instant when the shoe re-descends in place on the wheel.

It is to be understood that when one angularly displaces the lever 3, for example, in the direction of the arrow F1 in FIG. 3, the teeth of the shoe slide on the teeth of the wheel. The shoe, housed with clearance in the slot, inclines itself while elastically retracting due to deformation of the blades.

When the teeth of the shoe arrive at the tops of the teeth of the wheel (FIG. 4), the shoe is vigorously pushed by the deformed blades whereby the teeth 4a re-assume their position in the hollows of the teeth of the wheel and by this action, the teeth of the shoe snap on the flanks of the teeth of the wheel and emit a sound whose intensity is proportional to the size of the teeth and the number of the teeth on the shoe.

It is further seen that the surfaces situated on each side of the shoe are disengaged, the extreme teeth being truncated if necessary in order that no flank of the teeth of the shoe and of the wheel are in contact in a position to oppose the release and successive engagement of the teeth of the shoe with the teeth of the wheel.

In the illustrated embodiment, the shoe and the flexible blades i.e. elastic means are formed as a single molded piece of plastic material, but it is obvious that the elastic means can be independent of the shoe and of different material. Similarly, the number of teeth of the shoe can be different. At a limit, it is not excluded that the shoe has only a single central tooth.

In another embodiment, there can be also provided a toothed wheel having as many teeth as there are pinions on the free wheel cluster in order that each snap corresponds to the passage of one speed; this with a shoe having one or a plurality of teeth. There can further be conceived a toothed wheel having at regular intervals progressively larger hollows between teeth corresponding to the single tooth of the shoe and indicating by its different sound the change of the speed. It is also possible to reverse the mechanism, that is to say, to provide a lever having a toothed ring turning with respect to a toothed shoe positioned elastically on the shaft of the lever or even to mount a plurality of toothed shoes around the wheel or internally of the ring.

There is illustrated in FIGS. 7, 8 and 9 the mounting of two levers, with sound producing apparatus, for control of front and rear derailleurs on an attachment assembly to an element $C_1$ of the frame of the bicycle.

As seen particularly in FIG. 8, the assembly comprises a shaft 5 which traverses a block 6 and extends from each side thereof, the extremities of the shaft having parallel flat surfaces 5a. The block 6 is provided, in a direction perpendicular to the bore 6a for passage of the shaft with, a semi-cylindrical recess 6b permitting the mounting of the block on a tubular elememt $C_1$.

A complementary semi-cylindrical strap in collar 7 is pivotally connected at one side to the block by a bent portion 7a traversed by a shaft 8 on which is mounted the head 9a of a bolt 9 engaged in a bore in the block and threaded in a threaded hole 5b in the shaft 5. At the opposite side a locking bolt 10 traverses a bore in the block and is also threaded in a threaded hole 5c in the shaft 5 which is thus fixedly maintained in the block.

The end faces of the block have polygon supports 6c for the fixed mounting of sectors 11 having projections 11a adapted to serve as angular abutments for the control levers 12 which have for this purpose a projection 12a which travels in the path of the projection 11a. From the same side the levers receive in recess 12b toothed wheels 2 fixed to the shaft 5 by their central bore 2a with a shape similar to the flat surfaces 5a at the extremities of the shaft.

Slots 12c extend into the recess 12b to receive toothed shoes 4 having flexible blades 4b.

On their opposite surfaces, the levers are provided with recesses 12d for receiving rings 15 having bores 15a corresponding to the flat surfaces 5a at the extremities of the shaft 5. The levers are then elastically locked in adjustable manner on the shaft through the intermediary of bolts 16 threaded in the extremities of the shaft 5 and whose drive heads 17 bear on elastic washers 18 and contact washers 19 at the flat end surrounding recess 12d.

The levers also have a groove 12e for receiving a winding of a control cable 20 whose enlarged end 20a is held in a recess 12f at the end of groove 12e.

It is to be noted that the block 6 forming one half of the attachment means to the frame collar can be utilized for the mounting of a single control lever with a minimum of modification.

The advantages clearly appear from the description and the following are particularly underlined: efficient and advantageous mounting of the control levers on the frame of the bicycle by the block 6 forming one-half of the collar mount and a spacing cross-piece.

clear perception of the change of the speed by simple and effective sound apparatus.

The invention is not limited only to the disclosed embodiments, but in contrast, it embraces all variations and modifications if defined by the appended claims.

What is claimed is:

1. Control lever apparatus for speed change devices of bicycles comprising a pivotal lever for controlling speed change, a shaft rotatably supporting said lever, and sound producing means mounted between said shaft and said lever for producing an audible sound as the lever undergoes rotation, said sound producing means comprising a toothed wheel and a shoe mounted between said shaft and lever for undergoing relative angular movement as said lever is rotated, said shoe being supported with clearance in a recess provided in said lever for undergoing limited radial and angular displacement relative to said wheel, said shoe having a limited angular sector with teeth in mesh with the teeth of the wheel, and elastic means acting on said shoe for yieldably urging the shoe and wheel in toothed engagement to produce audible sound upon angular displacement of the lever in either direction.

2. Apparatus as claimed in claim 1 wherein clearance in the mounting of said shoe is equal to at least one-half of a tooth width.

3. Apparatus as claimed in claim 1 wherein said toothed wheel and said shoe are made of plastic material.

4. Apparatus as claimed in claim 1 wherein the tooth of the shoe and the teeth of the wheel are constructed to correspond to the displacement of the speed change device from one pinion to another.

5. Apparatus as claimed in claim 1 wherein said elastic means comprises elastic blades secured to said shoe on a side thereof opposite said teeth, said recess in said lever including a slot receiving said shoe and undercuts opening into said slot, said blades having extremities engaged in said undercuts.

6. Apparatus as claimed in claim 5 wherein said toothed wheel is secured to said shaft and said shoe is movable in said slot.

7. Apparatus as claimed in claim 5 wherein said blades and said shoe are integrally formed as a one-piece body.

8. Apparatus as claimed in claim 1 comprising a block fixedly supporting said shaft, said block being provided with a semi-cylindrical recess extending perpendicular to said shaft, a semi-cylindrical collar opposed to said recess to form a cylindrical opening for engaging a tubular element of the body of the bicycle, and locking bolts carried by said collar and engageable in threaded holes provided in said shaft.

9. Apparatus as claimed in claim 8 wherein two of said levers are mounted on said shaft at opposite ends of said block, the latter serving as a spacer for said levers.

10. Apparatus as claimed in claim 9 comprising resilient means engaging opposite ends of said shaft for applying adjustable axial pressure to said levers to hold the same axially on said shaft.

* * * * *